(12) United States Patent
Mishne et al.

(10) Patent No.: US 10,423,672 B2
(45) Date of Patent: Sep. 24, 2019

(54) NETWORK RESOURCE-SPECIFIC SEARCH ASSISTANCE

(75) Inventors: Gilad Avraham Mishne, Oakland, CA (US); Umut Ozertem, Sunnyvale, CA (US)

(73) Assignee: Excalibur IP, LLC, Sunnyvale, CA (US)

( * ) Notice: Subject to any disclaimer, the term of this patent is extended or adjusted under 35 U.S.C. 154(b) by 1023 days.

(21) Appl. No.: 12/897,620

(22) Filed: Oct. 4, 2010

(65) Prior Publication Data
US 2012/0084297 A1    Apr. 5, 2012

(51) Int. Cl.
  *G06F 7/00*       (2006.01)
  *G06F 16/951*     (2019.01)
  *G06F 16/332*     (2019.01)

(52) U.S. Cl.
  CPC ........ *G06F 16/951* (2019.01); *G06F 16/3322* (2019.01)

(58) Field of Classification Search
  CPC .................................................. G06F 16/3322
  USPC ................. 707/713, 759, 765, 769
  See application file for complete search history.

(56) References Cited

U.S. PATENT DOCUMENTS

| | | | | |
|---|---|---|---|---|
| 7,853,719 B1 * | 12/2010 | Cao | ...................... | G06F 16/9566 709/245 |
| 8,346,753 B2 * | 1/2013 | Hayes | ................... | G06F 16/951 707/709 |
| 2007/0276803 A1 * | 11/2007 | Shakib | .................. | G06F 16/951 |
| 2008/0288476 A1 * | 11/2008 | Kim | .................. | G06F 17/30905 |
| 2009/0083232 A1 * | 3/2009 | Ives | ........................ | G06F 16/951 |
| 2009/0187515 A1 * | 7/2009 | Andrew | .............. | G06F 16/9535 706/12 |
| 2010/0063878 A1 * | 3/2010 | Bachet | ............... | G06Q 30/0251 705/14.49 |
| 2011/0015996 A1 * | 1/2011 | Kassoway | ........... | G06F 16/9558 705/14.49 |
| 2011/0083167 A1 * | 4/2011 | Carpenter | ............... | H04L 67/10 726/4 |
| 2012/0023120 A1 * | 1/2012 | Kanefsky | ............ | G06F 16/9574 707/767 |
| 2012/0036121 A1 * | 2/2012 | Jitkoff | ..................... | G06F 3/167 707/722 |

(Continued)

OTHER PUBLICATIONS

Rayson, Paul et al, "Comparing Corpora using Frequency Profiling," *Annual Meeting of the ACL Proceedings of the workshop on Comparing corpora*—vol. 9, 2000.

(Continued)

*Primary Examiner* — Eliyah S. Harper
(74) *Attorney, Agent, or Firm* — Pillsbury Winthrop Shaw Pittman LLP

(57) ABSTRACT

One embodiment identifies a set of network resources relating to a search query; determines one or more sets of query suggestions for one or more network resources from the set of network resources, respectively, wherein each one of the one or more sets of query suggestions is related to a corresponding one of the one or more network resources; and provides the one or more network resources and the one or more sets of query suggestions in response to the search query, wherein each one of the one or more sets of query suggestions is provided in association with its corresponding one of the one or more network resources.

22 Claims, 9 Drawing Sheets

(56) References Cited

U.S. PATENT DOCUMENTS

2013/0054631 A1* 2/2013 Govani ............... G06F 16/9535
                                                    707/767
2014/0189435 A1* 7/2014 Manuel-Devadoss ......................
                                                    H04L 41/0253
                                                    714/43

OTHER PUBLICATIONS

Navarro, Gonzalo, A Guided Tour to Approximate String Matching, *CM Computing Surveys* 33(1), 2001.
"Levenshtein distance, " *Wikipedia*, from http://en.wikipedia.org/w/index.php?title=Levenshtein_distance&printable=yes, downloaded Sep. 14, 2010, Sep. 13, 2010.

* cited by examiner

YAHOO!

SearchScan - On

| mac | Search |

Web Images Video Local Shopping News More ▼

Options ▼

265,000,000 results for mac:

Also try: mac cosmetics, mac games, bernie mac, freddie mac, More...

MAC Cosmetics
Offering a large selection of makeup, skin care products, and nail care items. Also offering cosmetic accessories.
Also try: mac cosmetics, mac makeup, mac cosmetics makeup
www.maccosmetics.com -- Cached — 201

Apple - Mac
Discover the world of Mac. Check out MacBook, iMac, iLife, and more. Download QuickTime, Safari, and widgets for free.
Also try: apple mac computers, apple computers, mac computers, apple mac
www.mac.com -- Cached — 202

Apple (Nasdaq: AAPL)
Apple designs and creates iPod and iTunes. Mac laptop and desktop computers, the OS X operating system, and the revolutionary iPhone and iPad.
Also try: apple store, apple computers
www.apple.com -- Cached — 203

S'MAC - Sarita's Macaroni & Cheese
East Village restaurant specializing in Macaroni & Cheese ... Irresistible Mac-n-Cheese! Order Online. Organizations we support. S'MAC in the media.
Also try: s'mac nyc, mac and cheese, mac cheese
www.smacnyc.com -- Cached — 204

Related Searches
○ sephora
○ apple
○ nordstrom
○ clinique
○ dell

NETWORK RESOURCE-SPECIFIC SEARCH ASSISTANCE

TECHNICAL FIELD

The present disclosure generally relates to providing query suggestions for search queries and more specifically relates to providing query suggestions in connection with individual network resources identified for search queries, where the query suggestions provided in connection with a particular network resource are selected based in part on the content of that network resource.

BACKGROUND

The Internet provides a vast amount of information. The individual pieces of information are often referred to as "network resources" or "network contents" and may have various formats, such as, for example and without limitation, texts, audios, videos, images, web pages, documents, executables, etc. The network resources or contents are stored at many different sites, such as on computers and servers, in databases, etc., around the world. These different sites are communicatively linked to the Internet through various network infrastructures. Any person may access the publicly available network resources or contents via a suitable network device (e.g., a computer, a smart mobile telephone, etc.) connected to the Internet.

However, due to the sheer amount of information available on the Internet, it is impractical as well as impossible for a person (e.g., a network user) to manually search throughout the Internet for specific pieces of information. Instead, most network users rely on different types of computer-implemented tools to help them locate the desired network resources or contents. One of the most commonly and widely used computer-implemented tools is a search engine, such as the search engines provided by Microsoft® Inc. (http://www.bing.com), Yahoo!® Inc. (http://search.yahoo.com), and Google™ Inc. (http://www.google.com). To search for information relating to a specific subject matter or topic on the Internet, a network user typically provides a short phrase or a few keywords describing the subject matter, often referred to as a "search query" or simply "query", to a search engine. The search engine conducts a search based on the search query using various search algorithms and generates a search result that identifies network resources or contents that are most likely to be related to the search query. The network resources or contents are presented to the network user, often in the form of a list of clickable links, each link being associated with a different network document (e.g., a web page) that contains some of the identified network resources or contents. In particular embodiments, each link is in the form of a Uniform Resource Locator (URL) that specifies where the corresponding document is located and the mechanism for retrieving it. The network user is then able to click on the URL links to view the specific network resources or contents contained in the corresponding document as he wishes.

Sophisticated search engines implement many other functionalities in addition to merely identifying the network resources or contents as a part of the search process. For example, a search engine usually ranks the identified network resources or contents according to their relative degrees of relevance with respect to the search query, such that the network resources or contents that are relatively more relevant to the search query are ranked higher than and consequently are presented to the network user before the network resources or contents that are relatively less relevant to the search query. The search engine may also provide a short summary of each of the identified network resources or contents.

There are continuous efforts to improve the qualities of the search results generated by the search engines and the user-friendliness or ease-of-use of the search engines. Accuracy, completeness, presentation order, and speed are but a few of the performance aspects of the search engines for improvement.

SUMMARY

The present disclosure generally relates to providing query suggestions for search queries and more specifically relates to providing query suggestions in connection with individual network resources identified for search queries, where the query suggestions provided in connection with a particular network resource are selected based in part on the content of that network resource.

In particular embodiments, when network resources are identified for a search query issued to a search engine by a network user, query suggestions are provided to the network user as a part of the search result. In particular embodiments, the query suggestions are provided in connection with the individual network resources included in the search result. In particular embodiments, the query suggestions provided in connection with a specific network resource are selected based on the search query as well as the content of that network resource. In particular embodiments, the query suggestions provided in connection with each network resource are presented in close proximity to the associated network resource.

Particular embodiment identify a set of network resources relating to a search query; determine one or more sets of query suggestions for one or more network resources from the set of network resources, respectively, wherein each one of the one or more sets of query suggestions is related to a corresponding one of the one or more network resources; and provide the one or more network resources and the one or more sets of query suggestions in response to the search query, wherein each one of the one or more sets of query suggestions is provided in association with its corresponding one of the one or more network resources.

These and other features, aspects, and advantages of the disclosure are described in more detail below in the detailed description and in conjunction with the following figures.

BRIEF DESCRIPTION OF THE DRAWINGS

FIG. 2 illustrates an example search result identified for an example search query where query suggestions are provided with individual network resources included in the search result.

FIG. 4 illustrates an example search result identified for an example search query where query suggestions are provided with individual network resources included in the search result.

FIG. 5 illustrates an example search result identified for an example query suggestion selected by a network user that is inserted in a web page in association with the example query suggestion.

DESCRIPTION OF EXAMPLE EMBODIMENTS

Figure 1:
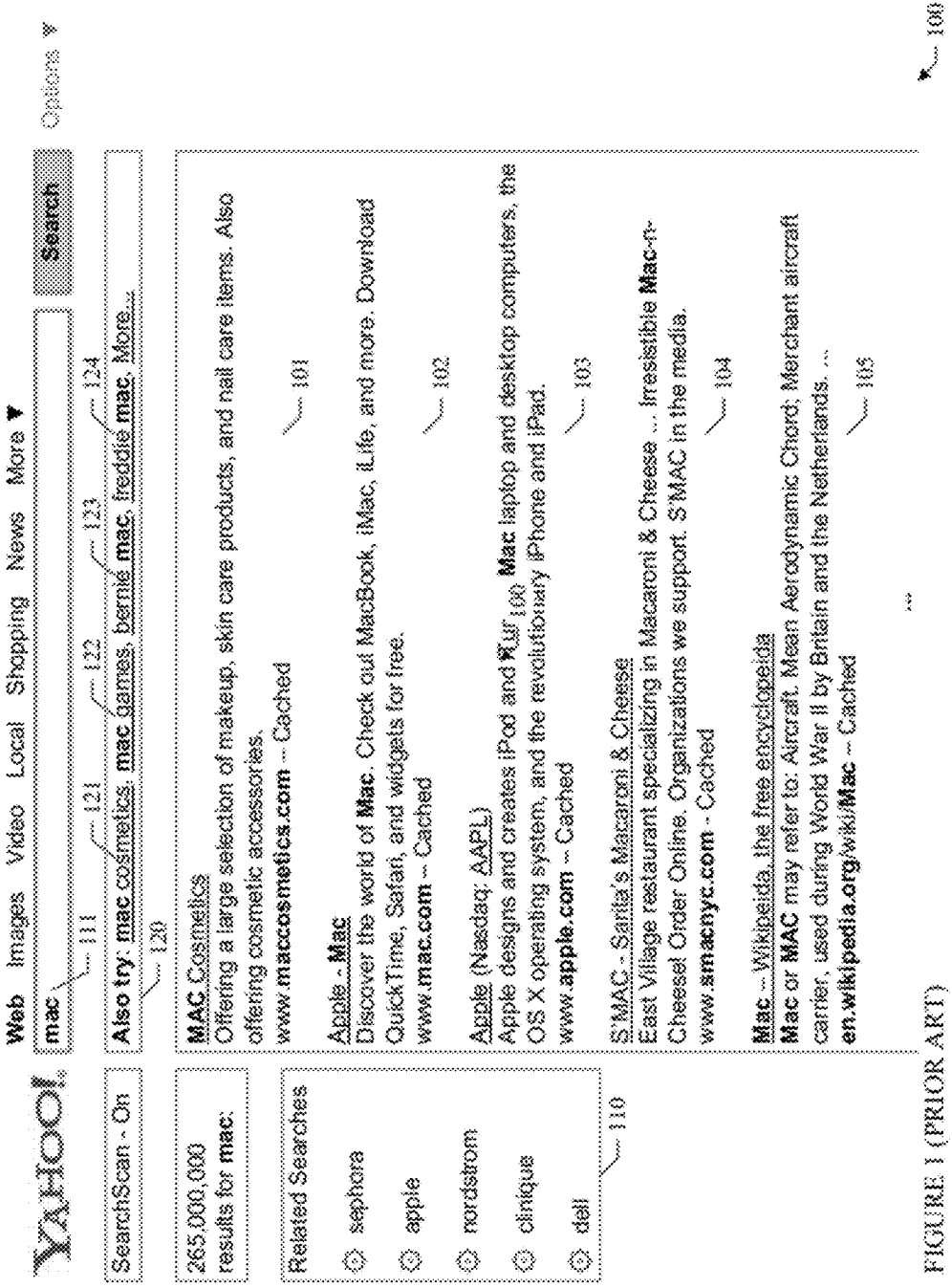
FIG. 1 (prior art) illustrates an example search result identified for an example search query.

The present disclosure is now described in detail with reference to a few embodiments thereof as illustrated in the accompanying drawings. In the following description, numerous specific details are set forth in order to provide a thorough understanding of the present disclosure. However, the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A search engine is a computer-implemented tool designed to search for information relevant to specific subject matters or topics on a network, such as the Internet, the World Wide Web, or an Intranet. To conduct a search, a network user may issue a search query to the search engine. The search query generally contains one or more words that describe a subject matter. In response, the search engine may identify one or more network resources that are likely to be related to the search query, which may collectively be referred to as a "search result" identified for the search query. Each network resource may have any format, such as, for example and without limitation, text, audio, video, image, web page, document (e.g., Adobe PDF or Microsoft Word documents), executable, etc.

Sophisticated search engines implement many other functionalities in addition to merely identifying the network resources as a part of the search process. For example, a search engine usually ranks the network resources identified for a search query according to their relative degrees of relevance with respect to the search query, such that the network resources that are relatively more relevant to the search query are ranked higher than and consequently are presented to the network user requesting the search before the network resources that are relatively less relevant to the search query. The search engine may also provide a short summary or an abstract of the content of each of the identified network resources. As another example, sometimes, network users may find it difficult to formulate words that exactly or closely describe the specific subject matters in which they are interested to be used as search queries. As a result, they may use words that have broad meanings or even words that do not precisely describe the subject matters they are looking for as search queries. In such cases, the intent of the network users, as indicated by the search queries, are often ambiguous. A search engine may provide query suggestions, usually determined based on the search queries issued to the search engine by the network users, to help the network users describe the subject matters they are looking for more precisely.

In particular embodiments, a search result may be presented in the form a web page. In this case, upon receiving a search query transmitted from a client device, a search engine may identify a set of network resources considered to be relevant to the search query, rank the identified network resources, determine a number of query suggestions for the search query, and then dynamically construct a web page that includes the appropriate information, which may include some of the identified network resources, some or all of the query suggestions, and optionally a number of advertisements that may be relevant to the search query. In particular embodiments, the web page may be transmitted to the client device in response to the search request using a suitable network protocol, such as the Hypertext Transfer Protocol (HTTP).

FIG. 1 illustrates an example web page 100 that includes several example network resources 101, 102, 103, 104, 105 identified for an example search query 111 (i.e., search query "mac"). Note that in order to simplify the discussion, FIG. 1 only illustrates five network resources 101, 102, 103, 104, 105 identified for search query 111. In practice, there may be any number (e.g., hundreds of thousands, millions, or even billions) of network resources identified for a search query. These network resources are often divided into multiple web pages, with each web page including a subset of the network resources identified for the search query. A network user may go through the individual web pages in turn to review the specific network resources. In FIG. 1, network resources 101, 102, 103, 104, 105 each include a title, a short summary describing the content of the network resource, and a Uniform Resource Locator (URL) specifying where the corresponding network resource is located and the mechanism for retrieving it. There is a clickable link associated with each network resource 101, 102, 103, 104, 105. A network user may click on the link associated with a specific network resource, which causes the network user to be directed to that network resource, to further review the detailed content of the specific network resource. For example, if the network user clicks on the link associated with network resource 101, the network user is directed to a web page located at "www.maccosmetics.com".

Sometimes, when a network user issues a search query to a search engine, the meaning of the search query by itself, and consequently the intent of the network user in connection with issuing the search query may be ambiguous, as there is no contextual information provided with the search query. This is especially so if there are relatively few number of words (e.g., one or two words) included in the search query. For example, search query 111 ("mac") in FIG. 1 may refer to a brand of cosmetic products (e.g., M•A•C Cosmetics), models of personal computers (e.g., iMac, MacBook, or Mac mini by Apple Inc.), a type of food (e.g., macaroni), a financial institute (e.g., Freddie Mac), an actor (e.g., Bernie Mac), and so on. Without additional contextual information, it is difficult to determine what type of information the network user is actually searching for when issuing search query 111 ("mac") to the search engine. That is, by examining search query 111 ("mac") alone, it is difficult, if not impossible, to determine the intent of the network user in connection with issuing search query 111 ("mac") to the search engine.

In particular embodiments, a search engine may provide query suggestions to help network users locate the specific information they are looking for, and thus making the search process more user friendly. For example, web page 100 includes two types of query suggestions: "related search" 110 and "also try" 120. Of course, theses are two example descriptions that may be used to describe various types of query suggestions. Other descriptive terms may also be used. A search engine may use both mechanisms to provide network users with query suggestions relating to the search queries issued to the search engine by the network users. For example, the "related-search" suggestions may be used to provide lateral query suggestions for the search queries while the "also-try" suggestions may be used to provide more subject-matter focused or subject-matter specific query suggestions for the search queries. As described above, search query 111 ("mac") may refer to different subject matters. Thus, in FIG. 1, "also-try" section 120 includes several query suggestions 121, 122, 123, 124, reformulating the words in each query suggestion to refer to a specific subject matter more clearly. For example query suggestion 121 refers to a specific brand of cosmetic products, while query suggestions 124 refers to a specific financial institute. The meanings of query suggestions 121, 122, 123, 124 are less ambiguous in comparison to search query 111 ("mac").

The network user may click on any of query suggestions 121, 122, 123, 124 that may describe the specific subject matter the network user is searching for more clearly. In particular embodiments, a network user clicking on a query suggestion causes that query suggestion to be automatically issued to the search engine as a separate search query. The search engine may treat the clicked query suggestion similarly as it treats any search queries issued to it by the network users. The search engine may identify a set of network resources for the clicked query suggestion, which has now become a search query, and present the identified network resources to the network user accordingly. For example, if the network user is really searching for information concerning the Federal Home Loan Mortgage Corporation when the network user issues search query 111 ("mac") to the search engine, the network user may click on query suggestion 124 ("freddie mac") to cause query suggestion 124 ("freddie mac"), which describes the financial institute more clearly and precisely, to be issued to the search engine.

In FIG. 1, "also-try" section 120 is placed near the top of web page 100 and includes query suggestions 121, 122, 123, 124 that refer to different subject matters because search query 111 ("mac") may relate to different subject matters. In such cases, a network user may need to examine several query suggestions presented in an "also-try" section (e.g., "also-try" section 120) to locate the one query suggestion that specifically and closely describes the subject matter in which the network user is interested. Each web page has a limited amount of space, and thus, only a small number of query suggestions may be presented in an "also-try" section. There may not be sufficient space in the "also-try" section to include query suggestions describing all the possible subject matters to which the original search query issued by the network user is related. The network user may have scrolled to the bottom of the web page to examine the network resources presented in the web page, and thus needs to scroll back to the top of the web page to review the query suggestions presented in an "also-try" section.

To address these issues, particular embodiments may provide "also-try" query suggestions in connection with individual network resources. In particular embodiments, the "also-try" query suggestions provided with a specific network resource may be related to the content of that network resource as well as the original search query issued to the search engine by the network user. In particular embodiments, the "also-try" query suggestions provided with a specific network resource may be presented in association with the network resource. For example, the "also-try" query suggestions provided with a network resource may be presented in close proximity (e.g., close physical proximity within a web page) to the network resource.

FIG. 2 illustrates an example web page 200 that includes several example network resources 201, 202, 203, 204 identified for an example search query 211 ("mac"). Again, in order to simplify the discussion, FIG. 2 only illustrates four network resources 201, 202, 203, 204 identified for search query 211. Similar to web page 100 illustrated in FIG. 1, web page 200 also includes an "also-try" section 220, which may include any number of query suggestions relating to search query 211 ("mac"), near the top of web page 200. In addition, in web page 200, network resources 201, 202, 203, 204 each have its own associated "also-try" sections 230, 240, 250, 260 respectively. Again, the term "also try" is an example description for the query suggestions. Other terms, such as "more results", may also be used, and the present disclosure contemplates any suitable terms used to describe a set of query suggestions, either associated with a search query or associated with a search query and a corresponding network resource. For each of network resources 201, 202, 203, 204, its associated "also-try" section 230, 240, 250, 260, respectively, may include any number of query suggestions relating to both the network resource (e.g., the content of the network resource) and search query 211 ("mac"). For example, network resource 201 is a web page from a website connected with M•A•C Cosmetics and includes information on cosmetic products by M•A•C Cosmetics. Thus, "also-try" section 230, which is associated with network resource 201, includes query suggestions, such as "mac cosmetics" and "mac makeup", that are related to both the content of network resource 201 (e.g., cosmetic products) and search query 211 ("mac"). As another example, network resource 202 is a web page that includes information on Mac products by Apple Inc. Thus, "also-try" section 240, which is associated with network resource 202, includes query suggestions, such as "apple mac computers", "apple computers", "mac computers" and "apple mac", that are related to both the content of network resource 202 (e.g., Mac products by Apple Inc.) and search query 211 ("mac").

In particular embodiments, "also-try" section 220 may be used to present query suggestions relating to search query 211 ("mac"), whereas each "also-try" section 230, 240, 250, 260 may be used to present query suggestions relating to both search query 211 ("mac") and the associated network resource 201, 202, 203, 204, respectively. Thus when determining the query suggestions to be presented in each of "also-try" sections 220, 230, 240, 250, 260, particular embodiments may determine the query suggestions to be presented in "also-try" section 220 based on search query 211 ("mac") without considering the content of the individual network resources (e.g., network resources 201, 202, 203, 204) identified for search query 211 ("mac"), and determine the query suggestions to be presented in each "also-try" section 230, 240, 250, 260 based on search query 211 ("mac") and the associated network resource 201, 202, 203, 204, respectively.

Comparing the query suggestions presented in each of "also-try" sections 220 230, 240, 250, 260, it is possible that the same query suggestion may appear in more than one of "also-try" sections 220, 230, 240, 250, 260. For example, query suggestion "mac cosmetics" appears in both "also-try" section 220 and "also-try" section 230 associated with network resource 201. Particular embodiments may not present the same query suggestion in more than one "also-try" sections in a web page. In particular embodiments, if a specific query suggestion is presented in a specific "also-try" section in a web page, that query suggestion is not presented in any subsequent "also-try" sections included in the web page. In this case, since query suggestion "mac cosmetics" appears in "also-try" section 220, it should be removed from "also-try" section 230 associated with network resource 201.

Comparing the query suggestions presented in each of "also-try" sections 220 230, 240, 250, 260, it is possible that two similar query suggestions may appear in the same "also-try" section or in two different "also-try" sections in a web page. For example, in "also-try" section 260 associated with network resource 204, query suggestions "mac and cheese" and "mac cheese" are very similar and describe essentially the same subject matter (i.e., macaroni and cheese). Given several similar query suggestions, particular embodiments may only present one of these similar query suggestions in one "also-try" section included in a web page. In particular embodiments, if a specific query suggestion is presented in an "also-try" section in a web page, no other query suggestions similar to that query suggestion is presented in any "also-try" sections in the web page. In this case, either query suggestion "mac and cheese" or query suggestion "mac cheese", but not both, may be presented in "also-try" section 260 associated with network resource 204.

In particular embodiments, for each network resource and its associated "also-try" query suggestions, the "also-try" query suggestions are presented in close proximity to the associated network resource. For example, in web page 200, "also-try" section 230 is place below the summary and above the URL of network resource 201; "also-try" section 240 is place below the summary and above the URL of network resource 202; and so on. In this case, network resources 201, 202, 203, 204 each include a title, a short summary describing the content of the network resource, a set of "also-try" query suggestions relating to the network resource and the corresponding search query, and a URL specifying where the corresponding network resource is located and the mechanism for retrieving it.

In particular embodiments, the network user may click on any query suggestion provided in "also-try" sections 220, 230, 240, 250, 260. In particular embodiments, a network user clicking on a specific query suggestion provided in any of "also-try" sections 220, 230, 240, 250, 260 causes that query suggestion to be automatically issued to the search engine as a separate search query. The search engine may treat the clicked query suggestion similarly as it treats any search queries issued to it by the network users. The search engine may identify a set of network resources for the clicked query suggestion, which has now become a search query, and present the identified network resources to the network user accordingly.

Figure 3:
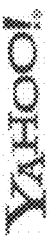
FIG. 3 illustrates an example search result identified for an example query suggestion selected by a network user.

For example, suppose the network user clicks on query suggestion "apple computers" provided in "also-try" section 240. Query suggestion "apple computers" is issued to the search engine as another search query. The search engine may identify a set of network resources for search query "apple computers". In particular embodiments, the search engine may dynamically construct another web page to present some of the network resources identified for search query "apple computers" to the network user. FIG. 3 illustrates an example web page 300 that includes several example network resources 301, 302, 303, 304 identified for an example search query 311 ("apple computers"). Search query 311 ("apple computers") results from the network user clicking on query suggestion "apple computers" presented in "also-try" section 240 in web page 200. In particular embodiments, upon clicking on query suggestion "apple computers" presented in "also-try" section 240 in web page 200, web page 300 may be presented to the network user.

The components and the layout of web page 300 are similar to those of web page 200. For example, web page 300 includes an "also-try" section 320 for providing query suggestions related to search query 311 ("apple computers"). In addition, network resources 301, 302, 303, 304 each include its associated "also-try" section 330, 340, 350, 360, respectively, for providing query suggestions related to search query 311 ("apple computers") and the associated network resource 301, 302, 303, 304. For example, "also-try" section 330 is presented in close proximity to network resource 301 and includes several query suggestions relating to both search query 311 ("apple computers") and the content of network resource 301; "also-try" section 340 is presented in close proximity to network resource 302 and includes several query suggestions relating to both search query 311 ("apple computers") and the content of network resource 302; and so on. Again, the network user may click on any query suggestion presented in any of "also-try" sections 320, 330, 340, 350, 360 in web page 300, which causes the clicked query suggestion to be issued to the search engine as another search query. The process may continue for as long as the network user desires.

Comparing network resources 201, 202, 203, 204 in web page 200 with network resources 301, 302, 303, 304 in web page 300, it is possible that the same network resource may be included in both web page 200 and web page 300. For example, network resource 203 in web page 200 and network resource 301 in web page 300 are in fact the same network resource, and network resource 202 in web page 200 and network resource 302 in web page 300 are in fact the same network resource. This is not unusual. Network resources 201, 202, 203, 204 are considered to be related to search query 211 ("mac"). Network resources 301, 302, 303, 304 are considered to be related to search query 311 ("apple computers"). Since search query 311 ("apple computers") is in fact a query suggestion for search query 211 ("mac"), search query 311 ("apple computers") is considered to be related to search query 211 ("mac"). Consequently, there may be a number of network resources that are considered to be related to both search query 211 ("mac") and search query 311 ("apple computers"), and these network resources may be included in both the search results identified for search query 211 ("mac") and for search query 311 ("apple computers"). However, the ranking of a network resource commonly included in both search results may differ between the two search results. For example, for search query 211 ("mac"), network resource 203 is presented as the third-ranked network resource in web page 200. On the other hand, for search query 311 ("apple computers"), network resource 301, which is the same network resource as network resource 203 in web page 200, is presented as the first-ranked network resource in web page 300.

Figure 4:
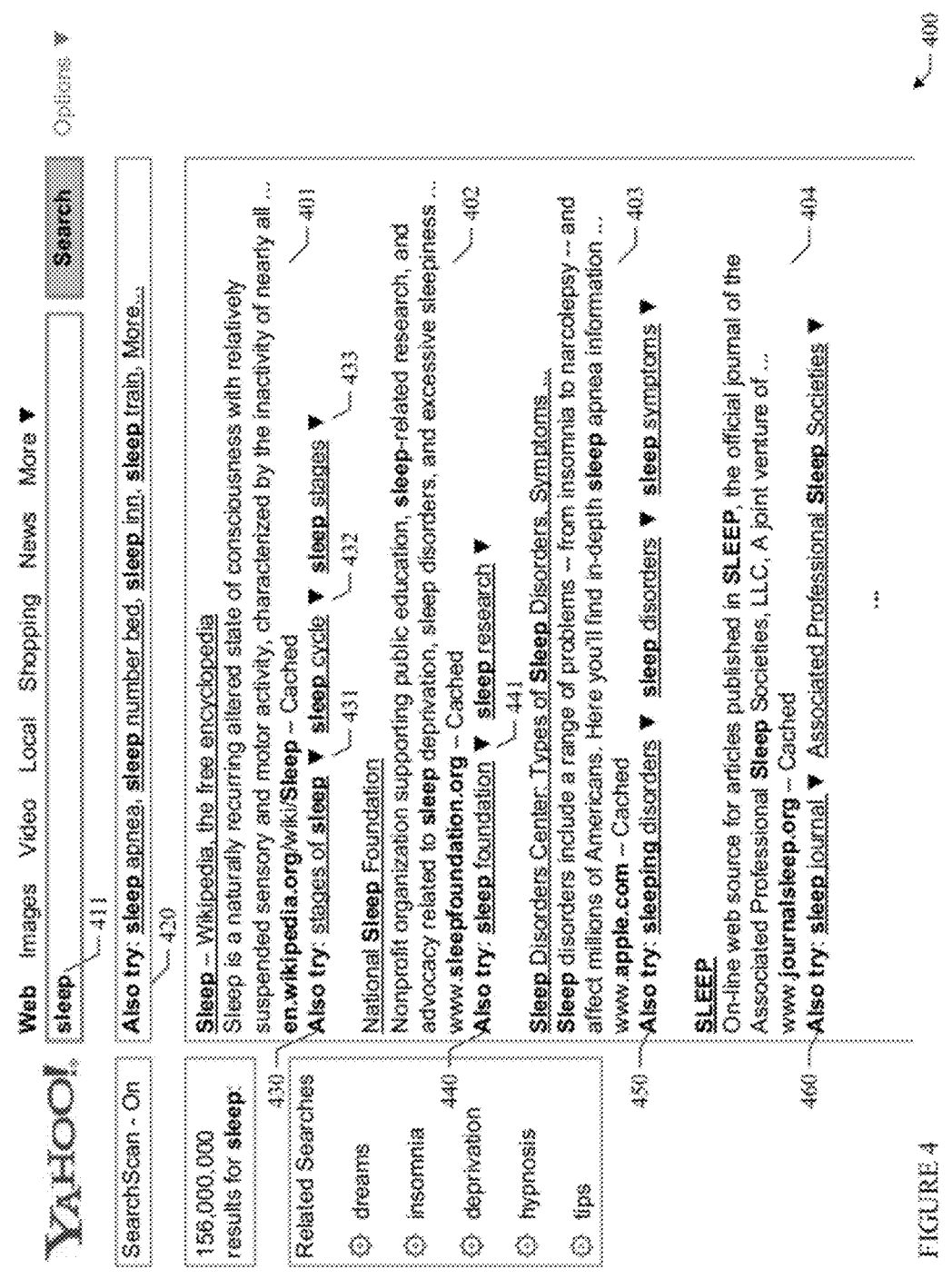

FIG. 4 illustrates an example web page 400 that includes several example network resources 401, 402, 403, 404 identified for an example search query 411 ("sleep"). Similar to web pages 200 and 300, web page 400 includes an "also-try" section 420 for presenting query suggestions related to search query 411 ("sleep"). In addition, for each of network resources 401, 402, 403, 404, there is an associated "also-try" section 430, 440, 450, 460, respectively, for presenting query suggestions related to both search query 411 ("sleep") and the associated network resource. More specifically, "also-try" section 430 is presented in close proximity to network resource 401 in web page 400 and may include any number of query suggestions relating to both search query 411 ("sleep") and network resource 401; "also-try" section 440 is presented in close proximity to network resource 402 in web page 400 and may include any number of query suggestions relating to both search query 411 ("sleep") and network resource 401; and so on.

"Also-try" sections 430, 440, 450, 460 in web page 400 differ from "also-try" sections 230, 240, 250, 260 in web page 200 and "also-try" sections 330, 340, 350, 360 in web page 300 in one aspect. As illustrated in FIG. 4, in particular embodiments, each query suggestion presented in each "also-try" section associated with each network resource is associated with a clickable icon (e.g., "▼"). For example, "also-try" section 430 associated with network resource 401 includes three query suggestions, "stages of sleep", "sleep cycle", and "sleep stages". Each of these three query suggestions is associated with a icon 431, 432, 433, respectively.

In particular embodiments, a network user may click on any query suggestion presented in any of "also-try" sections 420, 430, 440, 450, 460 in web page 400 or the icon, if there is one, associated with the query suggestion. A network user clicking on a specific query suggestion or its associated icon, if one exists, causes that query suggestion to be issued to the search engine as another search query. In response, the search engine may identify a set of network resources for the clicked query suggestion, which has become a search query.

Instead of constructing another web page to present some of the network resources identified for the clicked query suggestion, as illustrated with web page 300, particular embodiments may insert some of the network resources identified for the clicked query suggestion directly in the current web page (e.g., web page 400) used to present some of the network resources identified for the original search query. In particular embodiments, the network resources identified for the clicked query suggestion are placed in close proximity to the clicked query suggestion in the current web page.

For example, suppose the network user clicks on query suggestion "sleep foundation" or on icon 441 associated with query suggestion "sleep foundation" presented in "also-try" section 440 associated with network resource 402 in web page 400. This user action causes query suggestion "sleep foundation" to be issued to the search engine as another search query. In response, the search engine may identify a set of network resources for search query "sleep foundation". In particular embodiments, some of the network resources identified for search query "sleep foundation" may be inserted in web page 400 in association with clicked query suggestion "sleep foundation" (e.g., in close proximity to clicked query suggestion "sleep foundation") for presentation to the network user.

Figure 5:
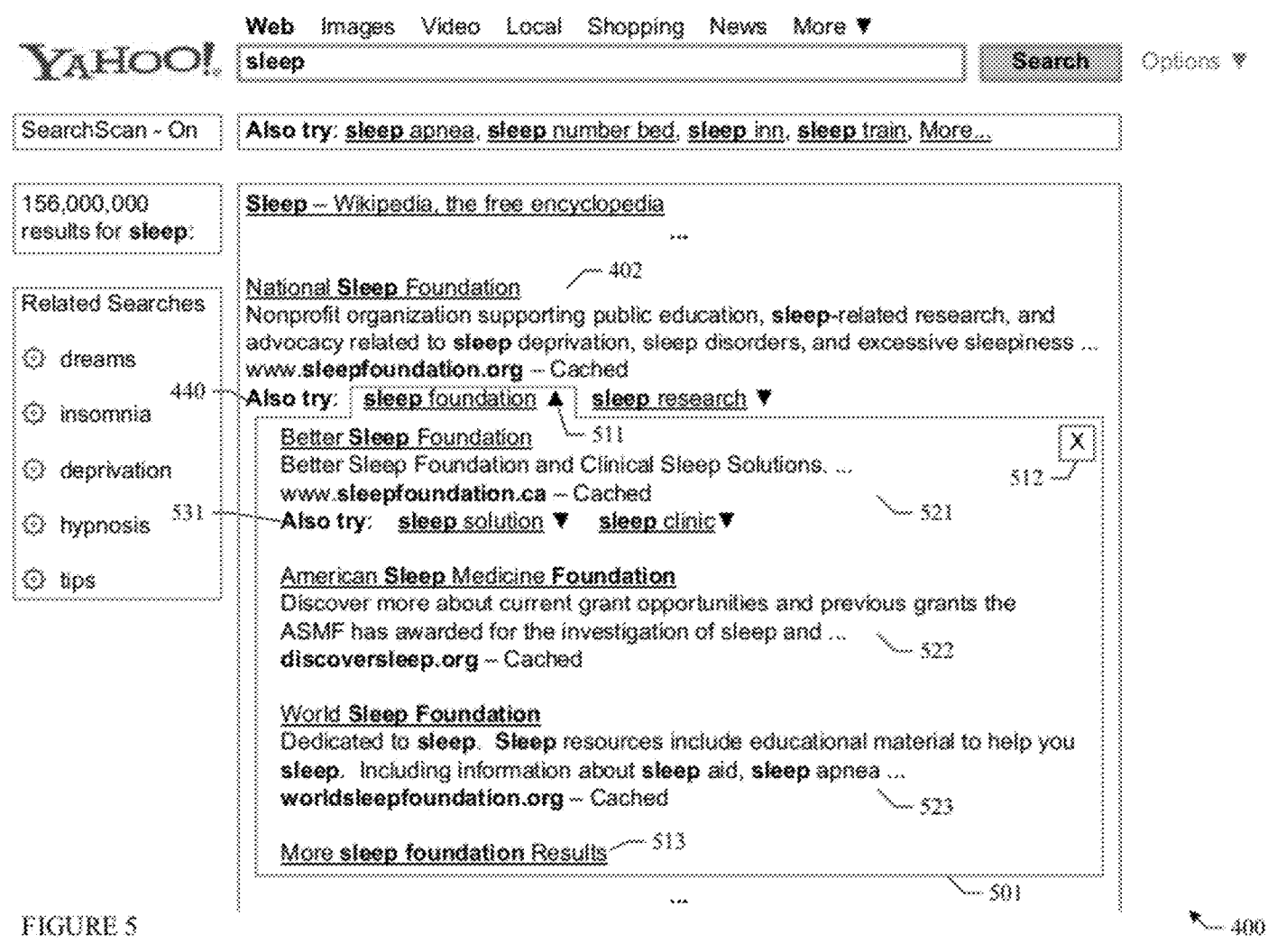

FIG. 5 illustrates web page 400 with some of the network resources identified for search query "sleep foundation" inserted therein, in association with corresponding clicked query suggestion "sleep foundation". In particular embodiments, as illustrated in FIG. 5, a new section 501 is inserted in web page 400 for presenting several network resources 521, 522, 523 identified for search query "sleep foundation" to the network user. In particular embodiments, section 501 is placed in association with and in close proximity to corresponding clicked query suggestion "sleep foundation". Due to the limited amount of space available in a web page, in particular embodiments, only a small number (e.g., two or three) of network resources identified for search query "sleep foundation" are presented in section 501 in web page 400. For example, the top-ranked two or three network resources identified search query "sleep foundation" may be displayed in section 501.

In particular embodiments, if a network resource has already been presented in web page 400, it is not included again in section 501. For example, the network resources presented in section 501 (e.g., network resources 521, 522, 523) are selected from the set of network resources identified for search query "sleep foundation". Network resource 402, which has already been presented in web page 400, is a web page at the website associated with the National Sleep Foundation. It is therefore very likely that network resource 402 is also in the set of network resources identified for search query "sleep foundation", and may be ranked fairly high in the set as well. However, since network resource 402 has already been presented in web page 400, in particular embodiments, it is not included again in section 501. Instead, if three network resources are to be presented in section 501, and network resource 402 is ranked second in the set of network resources identified for search query "sleep foundation", particular embodiments may skip network resource 402 and select the first-ranked, third-ranked, and fourth-ranked network resources from the set of network resources identified for search query "sleep foundation" to be included and presented in section 501.

In particular embodiments, some or all of network resources 521, 522, 523 may have their own associated "also-try" sections. For example, network resource 521 has its own associated "also-try" section 531, which includes query suggestions "sleep solution" and "sleep clinic" related to search query "sleep foundation" and network resource 521. In particular embodiments, the network user may click on the link provided with any network resource (e.g., network resources 521, 522, 523) included in section 501 to be directed to that network resource. In particular embodiments, the network user may click on any query suggestion provided in any "also-try" section associated with any network resource included in section 510 (e.g., query suggestions "sleep solution" or "sleep clinic" provided in "also-try" section 531) to cause that query suggestion to be issued to the search engine as another search query. In particular embodiments, if the network user wishes to view more network resources identified for search query "sleep foundation", the network user may click on a link 513 provided in section 501. In particular embodiments, a network user clicking on link 513 may cause another web page (e.g., a web page similar to web page 300) to be constructed, which includes some of the network resources identified for search query "sleep foundation", and to be presented to the network user.

In particular embodiments, section 501 may remain displayed in web page 400 until the network user decides to remove it from web page 400 or until the network user decides to view another web page. In particular embodiments, a clickable icon (e.g., "X") may be included in section 501. If the network user no longer wishes to view the information displayed in section 501, the network user may click on icon 512, which causes section 501 to be removed from web page 400, at which point web page 400 may return to the version illustrated in FIG. 4. In particular embodiments, a clickable icon 511 (e.g., "▲") may be associated with clicked query suggestion "sleep foundation". If the network user no longer wishes to view the information displayed in section 501, the network user may click on icon 511, which causes section 501 to be removed from web page 400, at which point web page 400 may return to the version illustrated in FIG. 4.

Figure 6:
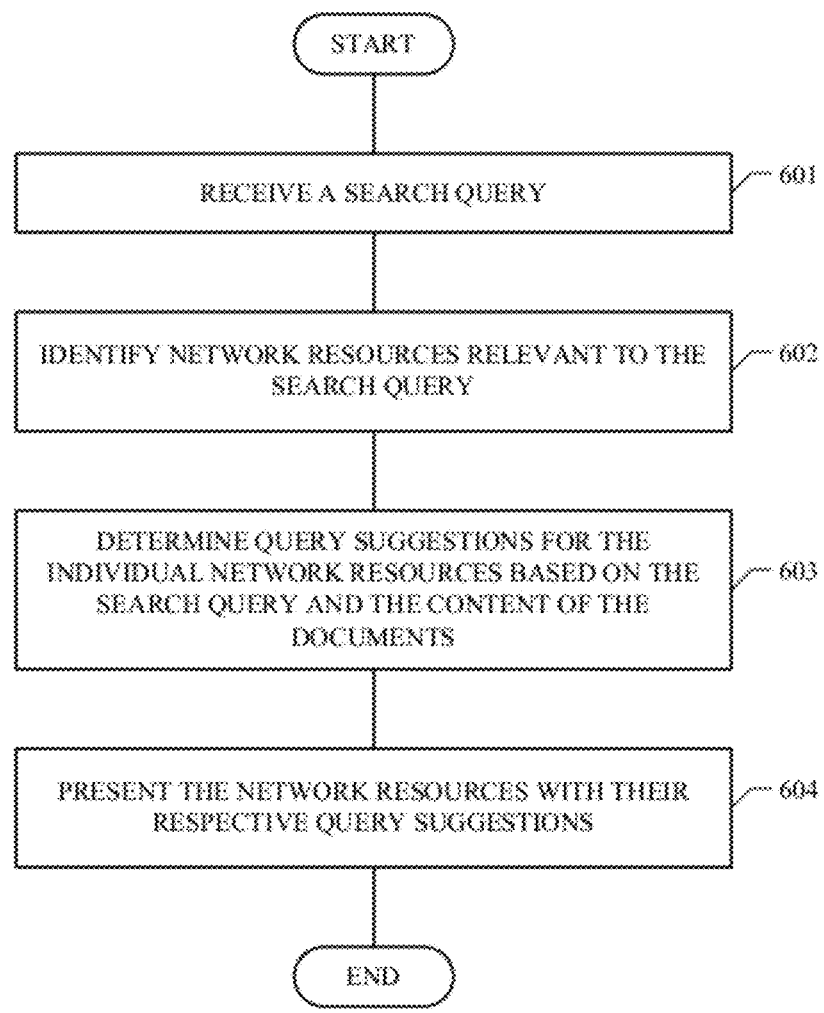
FIG. 6 illustrates an example method for providing query suggestions in connection with individual network resources identified for a search query.

FIG. 6 illustrates an example method for providing query suggestions in connection with individual network resources identified for a search query. In particular embodiments, a search engine may receive a search query, as illustrated in step 601. For clarity purposes, hereafter this search query is denoted as "$q_1$". In particular embodiments, search query "$q_1$" may be issued to the search engine by a network user. In general, to issue a search query to a search engine, a network user may load a web page representing the search engine into a web browser executing on a computing device used by the network user, and then enter the search query in the appreciate text field provided in the web page and submit the search query to the search engine (e.g., by clicking on the "Search" or "Submit" button provided in the web page). The search query is transmitted from the network user's computing device to a computing device hosting the search engine using a suitable network communication protocol (e.g., HTTP).

In particular embodiments, upon receiving search query "$q_1$", the search engine may conduct a search among the available network resources using any number of appropriate search algorithms, and identify a set of network resources that are considered to be relevant to search query "$q_1$", as illustrated in step 602. For clarity purposes, hereafter this set of network resources identified for search query "$q_1$" is denoted as "$R_1$". In particular embodiments, there may be any number (i.e., one or more) of network resources in network-resource set "$R_1$". In practice, there are often a large number of network resources identified for a search query. In particular embodiments, the network resources from network-resource set "$R_1$" may be ranked according to their relative degrees of relevance with respect to search query "$q_1$" using any number of appropriate ranking algorithms, such that the network resources that are relatively more relevant to search query "$q_1$" are ranked higher than the network resources that are relatively less relevant to search query "$q_1$".

In particular embodiments, query suggestions may be determined for the individual network resources from network-resource set "$R_1$", as illustrated in step 603. In particular embodiments, a set of query suggestions may be determined for each and every network resource from network-resource set "$R_1$". However, since in practice, there are often hundreds of thousands, millions, or even billions of network resources identified for a specific search query, it is not necessary and even impractical to determine a set of query suggestions for each and every network resource from network-resource set "$R_1$". In particular embodiments, a subset of network resources may be selected from network-resource set "$R_1$". Hereafter, let "$R'_1$" denote the subset of network resources selected from network-resource set "$R_1$". There may be any number of network resources selected from network-resource set "$R_1$" (i.e., $R'_1 \subseteq R_1$). For example, a number (e.g., ten, twenty, or thirty) of the top-ranked network resources from network-resource set "$R_1$" may be selected to form network-resource subset "$R'_1$". A set of query suggestions may then be determined for each network resource from network-resource subset "$R'_1$".

Let "$r_i^1$" denote a specific network resource from network-resource subset "$R'_1$", and let "$S_i^1$" denote a set of query suggestions determined for network resource "$r_i^1$". In particular embodiments, there may be any number (i.e., one or more) of query suggestions in query-suggestion set "$S_i^1$". In particular embodiments, each query suggestion from query-suggestion set "$S_i^1$" is related to both search query "$q_1$" and network resource "$r_i^1$". In particular embodiments, each query suggestion from query-suggestion set "$S_i^1$" may be determined based on search query "$q_1$" and the content of network resource "$r_i^1$".

In particular embodiments, a set of query suggestions may be determined for a network resource using information extracted from logs maintained by the search engine. Usually, a search engine maintains logs of activities performed in connection with the search engine, such as the search queries received at the search engine, the network resources identified for the search queries, the network resources clicked by the network users issuing the search queries, and so on. Each network resource may be identified in the logs by its unique URL. Particular embodiments may parse the logs obtained over some period of time (e.g., logs maintained for a year) to extract the search queries, the network resources identified for the individual search queries, and the individual network resources clicked by the network users in connection with the individual search queries.

For example, suppose the following. First, a first network user, "user 1", issues a first search query, "query 1", to the search engine. The search engine identifies five network resources, resources 1, 2, 3, 4, and 5 for query 1. Note that a small number of network resources is used to illustrate the concept and simplify the discussion. In connection with query 1, user 1 clicks on resources 1 and 4 but does not click on resources 2, 3, and 5. Second, user 1 issues a second search query, "query 2", to the search engine, The search engine identifies four network resources, resources 3, 4, 6, and 7 for query 2. In connection with query 2, user 1 clicks on resources 3, 4, and 6 but does not click on resource 7. Third, a second user, "user 2", also issues query 1 to the search engine. The search engine again identifies resources 1, 2, 3, 4, and 5 for query 1. In connection with query 1, user 2 clicks on resources 1 and 2 but does not click on resources 3, 4, and 5. Fourth, user 2 issues a third query, "query 3", to the search engine. The search engine identifies six network resources, resources 2, 5, 6, 7, 8, and 9 for query 3. In connection with query 3, user 2 clicks on resources 5 and 8 but does not click on resources 2, 6, 7, and 9. The above information may be summarized in the following TABLE 1.

TABLE 1

|  | query 1 | query 2 | query 3 |
| --- | --- | --- | --- |
| resource 1 | X, X | | |
| resource 2 | X | | |
| resource 3 | X | X | |
| resource 4 | X | X | |
| resource 5 | X | | X |
| resource 6 | | X | |
| resource 7 | | | |
| resource 8 | | | X |
| resource 9 | | | |

In TABLE 1, for each search query (e.g., query 1, query 2, and query 3), if a network resource is clicked by a network user in connection with that search query, the clicked network resource is marked with an "X" with respect to the search query. For example, resource 1 is clicked by both user 1 and user 2 in connection with query 1; thus, resource 1 is marked twice with respect to query 1. Resource 2 is clicked by user 2 in connection with query 1; thus, resource 2 is marked once with respect to query 1.

In particular embodiments, such resource clicking information may be determined for each search query extracted from the logs maintained by the search engine. That is, for each search query extracted from the search-engine logs, particular embodiments may determine: (1) which network resources have been clicked by the network users in connection with the search query; and (2) for each of the clicked network resources, the number of times that network resource has been clicked by the network users in connection with the search query (i.e., the resource-click frequency).

In particular embodiments, given any search query, "q", extracted from the search-engine logs, there is a set of network resources, "$\{r_1, \ldots, r_n\}$", where $n \geq 1$, that have been clicked by the network users in connection with search query "q" and a corresponding set of resource-click frequencies, "$\{f_1, \ldots, f_n\}$", which indicates the number of times each network resource has been clicked by the network users. All the information may be extracted from the search-engine logs. Then, particular embodiments may compute the average resource-click frequency, "$\bar{f}$", for search query "q", as $$\bar{f} = \frac{\sum_{i=1}^{n} f_i}{n}.$$

Figure 7:
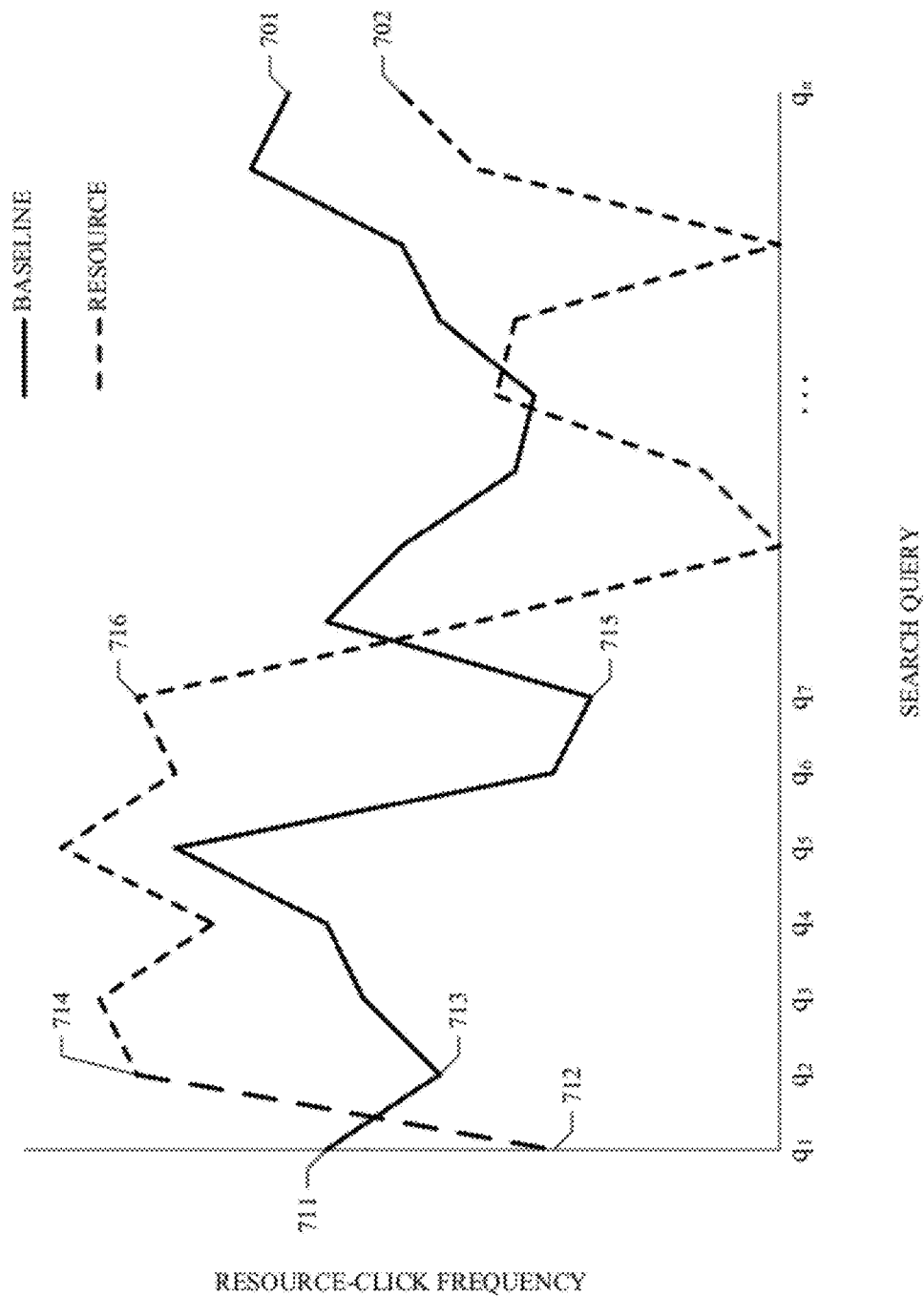
FIG. 7 illustrates an example chart used for determining query suggestions for a specific network resource and a search query.

In particular embodiments, the average resource-click frequency may be similarly computed for each search query extracted from the search-engine logs. The search queries and their corresponding average resource-click frequencies may be used to provide a baseline for determining the query suggestions for the individual network resources. FIG. 7 illustrates an example chart that illustrates the relationships between the search queries and their corresponding resource-click frequencies. In FIG. 7, the x-axis represents the search queries and the y-axis represents the resource-click frequencies. The solid line 701 represents the baseline obtained by plotting the search queries versus their respective average resource-click frequencies.

In particular embodiments, given a specific network resource, "r", there is a set of search queries, "$\{q_1, \ldots, q_m\}$", where $m \geq 1$, such that with respect to each search query "$q_i$", where $1 \leq i \leq m$, network resource "r" has been clicked at least once by at least one network user. In addition, there is a corresponding set of resource-click frequencies, "$\{f_1, \ldots, f_m\}$", which indicates the number of times network resource "r" has been clicked with respect to each search query "$q_i$" by the network users. Particular embodiments may plot the search queries versus their respective resource-click frequencies for network resource "r". In FIG. 7, the dash line 702 represents the search queries versus resource-click frequencies for a specific network resource (e.g., network resource "r"). Note that if network resource "r" has never been clicked by any network user with respect to a specific search query, the corresponding resource-click frequency for network resource "r" with respect to that search query may be considered zero.

Comparing solid line 701 and dash line 702 in FIG. 7, with respect to each individual search query, the resource-click frequency for network resource "r" may be above, below, or similar to the average resource-click frequency. For example, in FIG. 7, with respect to search query "$q_1$", the resource-click frequency for network resource "r" 712 is below the average resource-click frequency 711. On the other hand, with respect to search query "$q_2$", the resource-click frequency for network resource "r" 714 is above the average resource-click frequency 713. With respect to each search query "$q_i$", particular embodiments may determine the difference between the resource-click frequency for network resource "r" and the average resource-click frequency. For example, in FIG. 7, with respect to search query "$q_1$", the difference between frequency 712 (i.e., resource-click frequency for network resource "r") and frequency 711 (i.e., the average resource-click frequency) is a negative number since frequency 712 is less than frequency 711. With respect to search query "$q_2$", the difference between frequency 714 and frequency 713 is a positive number since frequency 714 is greater than frequency 713.

Particular embodiments may select a number of (e.g., five or ten) search queries having the largest differences between their respective resource-click frequencies for network resource "r" and the average resource-click frequencies as the query suggestions for network resource "r". For example, in FIG. 7, with respect to search query "$q_7$", the difference between the resource-click frequency for network resource "r" 716 and the average resource-click frequency 715 is very large. Thus, search query "$q_7$" may be selected as a query suggestion for network resource "r". The process may be similarly applied to each network resource to determine a set of query suggestions for each network resource from network-resource subset "$R'_1$", as illustrated in step 603 of FIG. 6.

Particular embodiments may use the Log Likelihood Ratio (LLR) test to help determine the query suggestions for each network resource from network-resource subset "$R'_1$". In statistics, a likelihood ratio test is used to compare the fit of two models, one of which is nested within the other. Briefly, in general, the LLR values may be computed as the following with respect to two corpora using word frequencies as an example. Suppose there are two corpora of word frequencies as illustrate in TABLE 2 below.

TABLE 2

| Word Frequencies | | | |
|---|---|---|---|
| | Corpus One | Corpus Two | Total |
| Frequency of Word | a | b | a + b |
| Frequency of Other Words | c − a | d − b | c + d − a − b |
| Total | c | d | c + d |

The LLR value may be computed as $$LLR = 2\left(\left(a \log\left(\frac{a}{E1}\right)\right) + \left(b \log\left(\frac{b}{E2}\right)\right)\right), \text{ where}$$

$$E1 = \frac{c(a+b)}{(c+d)} \text{ and}$$

$$E2 = \frac{d(a+b)}{(c+d)}.$$

Given each network resource (e.g., network resource "$r_i^1$") from network-resource subset "$R'_1$", particular embodiments may use LLR to compute the difference between the resource-click frequency of network resource "$r_i^1$" and the average resource-click frequency in connection with each search query "$q_i$". As applied to the present case, the first corpus may be the average resource-click frequencies (instead of word frequencies) with respect to the search queries. The second corpus may be the resource-click frequencies for a specific network resource with respect to the search queries. Given a specific network resource, particular embodiments may select a number of search queries having the largest LLR values to form the set of query suggestions for the network resource.

Given each network resource (e.g., network resource "$r_i^1$") from network-resource subset "$R'_1$", suppose a set of query suggestions (e.g., query-suggestion set "$S_i^1$") has been determined for the network resource using the LLR values as described above. Sometimes, some of the query suggestions from query-suggestion set "$S_i^1$" may be similar to each other. Particular embodiments may remove certain query suggestions from query-suggestion set "$S_i^1$" if they are sufficiently similar to other query suggestions from query-suggestion set "$S_i^1$". For example, suppose two query suggestions, "$S_{j1}^1$" and "$S_{j2}^1$", are both from query-suggestion set "$S_i^1$". If query suggestions "$S_{j1}^1$" and "$S_{j2}^1$" are sufficiently similar to each other, particular embodiments may remove one of them, either query suggestion "$S_{j1}^1$" or query suggestion "$S_{j2}^1$" from query-suggestion set "$S_i^1$".

To determine whether two query suggestions are similar, particular embodiments may determine an edit distance, also known as the Levenshtein distance, between the two query suggestions. In information theory and computer science, the Levenshtein distance is a metric for measuring the amount of distance between two sequences (e.g., two strings). The Levenshtein distance between two strings is defined as the minimum number of edits needed to transform one string into the other string, with the allowable edit operations being insertion, deletion, or substitution of a single character or a single word. For example, consider two query suggestions "mac computer" and "imac computers". The edit distance between them is two characters (i.e., inserting "i" and "s" in the first query suggestion transforms it into the second query suggestion). As another example, for two query suggestions "mac and cheese" and "mac cheese", the edit distance between them is three characters or one word (i.e., deleting "and" from the first query suggestion transforms it into the second query suggestion). Particular embodiments may determine the edit distance between query suggestions "$S_{j1}^1$" and "$S_{j2}^1$". If the edit distance is sufficiently small (e.g., less than or equal to three characters or one word), query suggestions "$S_{j1}^1$" and "$S_{j2}^1$" may be considered sufficiently similar so that one of them is removed from query-suggestion set "$S_i^1$".

In particular embodiments, in response to receiving search query "$q_1$" at the search engine, a web page (e.g., web page 200 or 400 illustrated in FIG. 2 or 4 respectively) may be dynamically constructed to present some of the network resources from network-resource set "$R_1$", which has been identified for search query "$q_1$", as illustrated in step 604. If a specific network resource "$r_i^1$" has an associated set of query suggestions "$S_i^1$" determined for it using the LLR values, some of the query suggestions from query-suggestion set "$S_i^1$" may also be included in the web page in close proximity to network resource "$r_i^1$". The web page may be transmitted to computing device used by the network user request the search using an appropriate network communication protocol (e.g., HTTP). The web page may be displayed in the web browser executing on the network user's computing device. Thereafter, the network user may perform various actions in connection with the web page (e.g., clicking on a query suggestion or a link associated with a network resource displayed in the web page).

For example, suppose the network user clicks on one of the query suggestions provided in one of the "also-try" sections included in the web page. In particular embodiments, this clicked query suggestion is automatically issued to the search engine as another search query (e.g., search query "$q_2$"). The search engine may identify a second set of network resources, "$R_2$", for search query "$q_2$". A subset of network resources, "$R'_2$", may be selected from network-resource set "$R_2$". A set of query suggestions may be similarly determined for each network resource from network-resource subset "$R'_2$". When the network resources from network-resource subset "$R'_2$" are presented to the network user, query suggestions from their respectively associated query-suggestion sets may be provided in association with the individual network resources.

Comparing, for example, web page 100 illustrated in FIG. 1 and web page 200 illustrated in FIG. 2, it is clear that by providing query suggestions in connection with the individual network resources, the present disclosure not only provides more query suggestions in each web page (i.e., a single "also-try" section versus multiple "also-try sections in a web page) but provides more subject-matter-specific or targetted query suggestions (i.e., the query suggestions provided in connection with a specific network resource are all related to that network resource). Consequently, it is easier for the network users to locate and click on the query suggestions that are more suitable to their search needs in each web page used to present search results to the network users. The present disclosure helps make the search process more user friendly.

Moreover, the additional "also-try" sections for providing additional query suggestions are placed in the individual web pages without disturbing the network users' abilities to locate the desired information in these web pages. Providing more query suggestions increases the likelihood that the network users may click on some of these query suggestions, which in turn increases overall page views, which is significantly correlated with generating revenue for the entities providing the search-engine services. In other words, more query suggestions lead to more page views, which in turn lead to additional revenue for the search-engine providers. The present disclosure thus help increases monetization for the search-engine providers.

Figure 8:
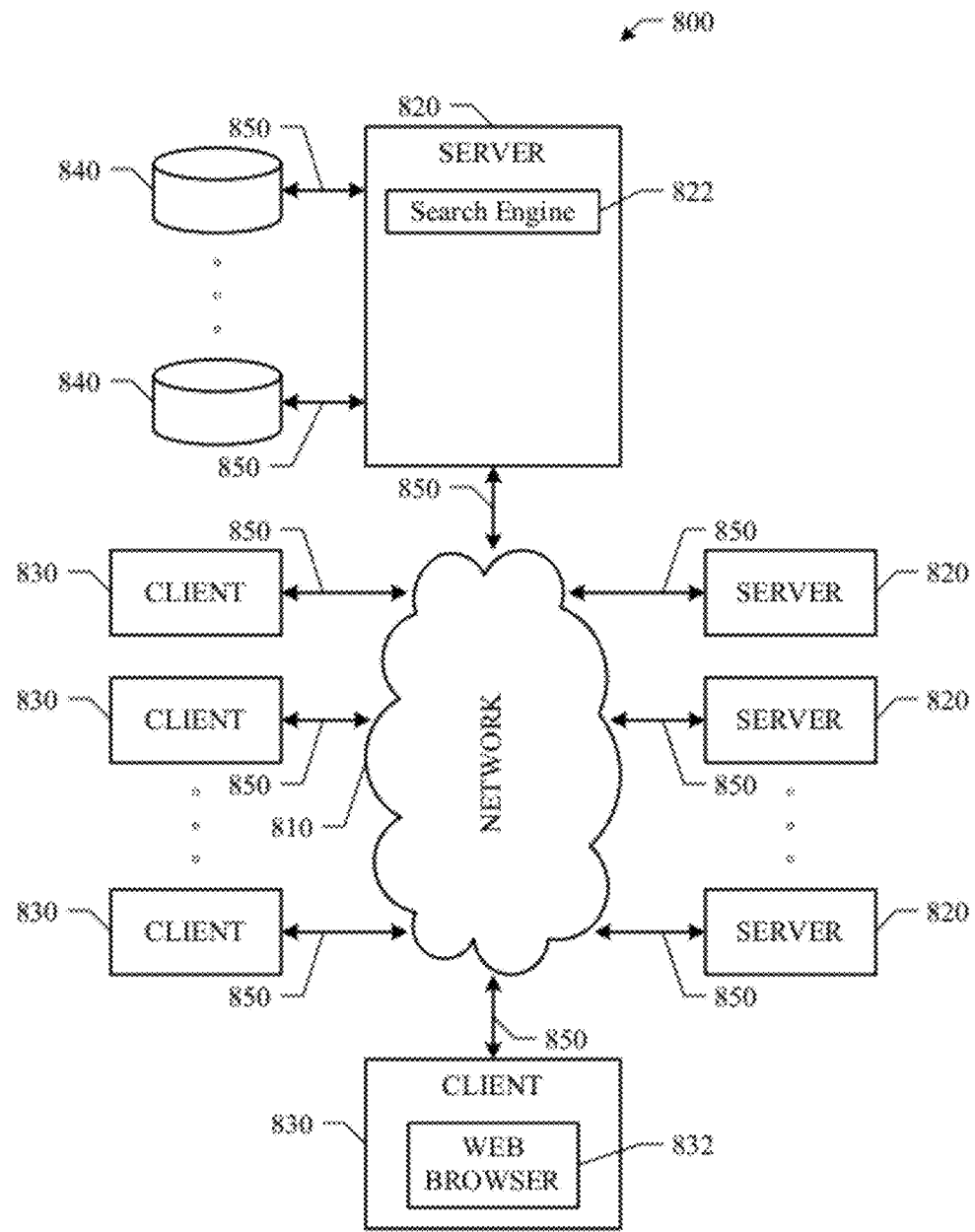
FIG. 8 illustrates an example network environment.

Particular embodiments may be implemented in a network environment. FIG. 8 illustrates an example network environment 800 suitable for providing software validation as a service. Network environment 800 includes a network 810 coupling one or more servers 820 and one or more clients 830 to each other. In particular embodiments, network 810 is an intranet, an extranet, a virtual private network (VPN), a local area network (LAN), a wireless LAN (WLAN), a wide area network (WAN), a metropolitan area network (MAN), a portion of the Internet, or another network 810 or a combination of two or more such networks 810. The present disclosure contemplates any suitable network 810.

One or more links 850 couple a server 820 or a client 830 to network 810. In particular embodiments, one or more links 850 each includes one or more wireline, wireless, or optical links 850. In particular embodiments, one or more links 850 each includes an intranet, an extranet, a VPN, a LAN, a WLAN, a WAN, a MAN, a portion of the Internet, or another link 850 or a combination of two or more such links 850. The present disclosure contemplates any suitable links 850 coupling servers 820 and clients 830 to network 810.

In particular embodiments, each server 820 may be a unitary server or may be a distributed server spanning multiple computers or multiple datacenters. Servers 820 may be of various types, such as, for example and without limitation, web server, news server, mail server, message server, advertising server, file server, application server, exchange server, database server, or proxy server. In particular embodiments, each server 820 may include hardware, software, or embedded logic components or a combination of two or more such components for carrying out the appropriate functionalities implemented or supported by server 820. For example, a web server is generally capable of hosting websites containing web pages or particular elements of web pages. More specifically, a web server may host HTML files or other file types, or may dynamically create or constitute files upon a request, and communicate them to clients 830 in response to HTTP or other requests from clients 830. A mail server is generally capable of providing electronic mail services to various clients 830. A database server is generally capable of providing an interface for managing data stored in one or more data stores.

In particular embodiments, a search engine 822 may be hosted on a server 820. In particular embodiments, search engine 822 may be implemented as computer software, hardware, or a combination thereof. The computer software may be stored in computer-readable, non-transitory storage media and executed on server 820. Search engine 822 may include various components that perform specific functionalities, including those described above in connection with FIGS. 1-7, such as identifying network resources for search queries, ranking network resources with respect to search queries, determining query suggestions for individual network resources, constructing web pages for presenting the network resources to network users, and so on.

In particular embodiments, one or more data storages 840 may be communicatively linked to one or more severs 820 via one or more links 850. In particular embodiments, data storages 840 may be used to store various types of information. In particular embodiments, the information stored in data storages 840 may be organized according to specific data structures. In particular embodiment, each data storage 840 may be a relational database. Particular embodiments may provide interfaces that enable servers 820 or clients 830 to manage, e.g., retrieve, modify, add, or delete, the information stored in data storage 840.

In particular embodiments, each client 830 may be an electronic device including hardware, software, or embedded logic components or a combination of two or more such components and capable of carrying out the appropriate functionalities implemented or supported by client 830. For example and without limitation, a client 830 may be a desktop computer system, a notebook computer system, a netbook computer system, a handheld electronic device, or a mobile telephone. The present disclosure contemplates any suitable clients 830. A client 830 may enable a network user at client 830 to access network 830. A client 830 may enable its user to communicate with other users at other clients 830.

A client 830 may have a web browser 832, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client 830 may enter a Uniform Resource Locator (URL) or other address directing the web browser 832 to a server 820, and the web browser 832 may generate a Hyper Text Transfer Protocol (HTTP) request and communicate the HTTP request to server 820. Server 820 may accept the HTTP request and communicate to client 830 one or more Hyper Text Markup Language (HTML) files responsive to the HTTP request. Client 830 may render a web page based on the HTML files from server 820 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Figure 9:
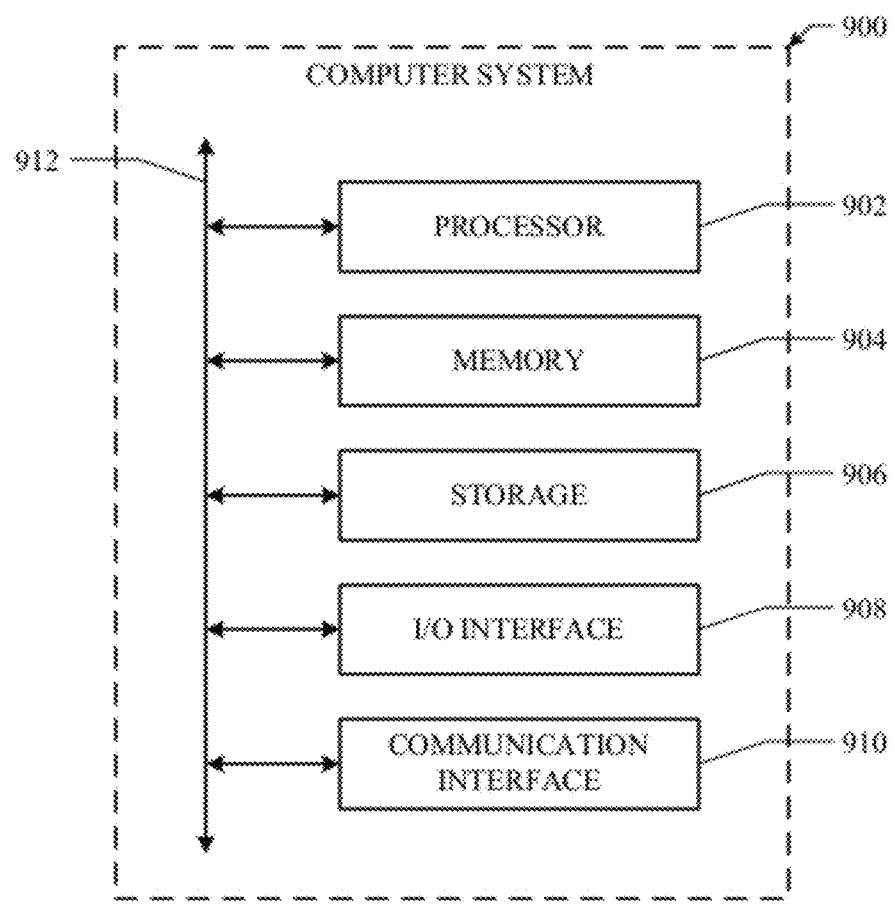
FIG. 9 illustrates an example computer system.

Particular embodiments may be implemented on one or more computer systems. FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 900 may include one or more computer systems 900; be unitary or distributed; span multiple locations; span multiple machines; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. The present disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. The present disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include an HDD, a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. § 101. Herein, reference to a computer-readable storage medium excludes transitory forms of signal transmission (such as a propagating electrical or electromagnetic signal per se) to the extent that they are not eligible for patent protection under 35 U.S.C. § 101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 902 (such as, for example, one or more internal registers or caches), one or more portions of memory 904, one or more portions of storage 906, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method, implemented on a machine having at least one processor, storage, and a communication platform connected to a network for providing one or more sets of query suggestions, comprising:
    obtaining a search query;
    identifying a set of network resources relating to the search query;
    selecting one or more network resources from the set of network resources;
    determining one or more sets of query suggestions, wherein each of the one or more sets corresponds to one of the one or more network resources, wherein each set of the one or more sets is determined based on both the search query and content in a corresponding network resource of the one or more network resources;
    constructing a web page comprising the one or more network resources and the one or more sets of query suggestions; and
    providing the web page in response to the search query, wherein each one of the one or more sets of query suggestions is placed in the web page below a summary describing the content of the corresponding network resource and above a Uniform Resource Locator (URL) specifying where the corresponding network resource is located.

2. The method recited in claim 1, further comprising ranking the set of network resources with respect to the search query, wherein the one or more network resources are one or more highest-ranking network resources from the set of network resources.

3. The method recited in claim 1, further comprising:
    parsing one or more logs maintained by a search engine to extract a plurality of search queries received at the search engine, a plurality of network resources identified for the plurality of search queries by the search engine, and a plurality of resource clicks performed by one or more network users in connection with the plurality of search queries;
    for each one of the plurality of search queries,
        determining a subset of network resources from the plurality of network resources, wherein each network resource from the subset of network resources is accessed by at least one network user in connection with the search query;

determining a resource-click frequency for each network resource from the subset of network resources that represents a total number of times that network resource is accessed in connection with the search query; and computing an average resource-click frequency for the subset of network resources that represents an average number of times each network resource from the subset of network resources is accessed in connection with the search query.

4. The method recited in claim 3, wherein determining each one of the one or more sets of query suggestions for the corresponding network resource comprises:

for each one of the plurality of search queries,
  determining a resource-click frequency for the corresponding network resource representing a total number of times the corresponding network resource is accessed in connection with the search query; and
  determining a difference between the resource-click frequency of the corresponding network resource in connection with the search query and the average resource-click frequency of the search query; and selecting, from the plurality of search queries, one or more search queries corresponding to the difference that is largest to form one set of query suggestions for the corresponding network resource.

5. The method recited in claim 4, wherein determining each one of the one or more sets of query suggestions for the corresponding network resource further comprises:

if two or more query suggestions from the one set of query suggestions are sufficiently similar to each other, then removing all except one of the two or more query suggestions from the one set of query suggestions.

6. The method recited in claim 1, wherein the one or more network resources comprises one or more first network resources from the set of network resources, the method further comprises:

providing one or more second network resources from the set of network resources in response to the search query by including the one or more second network resources in the web page.

7. The method recited in claim 1, further comprising:

receiving a selection of a query suggestion from one of the one or more sets of query suggestions included in the web page;

identifying a second set of network resources relating to the query suggestion;

determining one or more second sets of query suggestions for one or more network resources from the second set of network resources, respectively, wherein each one of the one or more second sets of query suggestions is related to a corresponding one of the one or more network resources from the second set of network resources; and inserting, in the web page, the one or more network resources from the second set of network resources and the one or more second sets of query suggestions in the web page in association with the query suggestion, wherein each one of the one or more second sets of query suggestions is proximate to the corresponding one of the one or more network resources from the second set of network resources.

8. The method recited in claim 7, wherein the one or more network resources from the second set of network resources relating to the query suggestion are different from the one or more network resources from the set of network resources relating to the search query.

9. The method recited in claim 1, further comprising:

receiving a selection of a query suggestion from one of the one or more sets of query suggestions included in the web page;

identifying a second set of network resources relating to the query suggestion;

determining one or more second sets of query suggestions for one or more network resources from the second set of network resources, respectively, wherein each one of the one or more second sets of query suggestions is related to a corresponding one of the one or more network resources from the second set of network resources;

constructing a second web page comprising the one or more network resources from the second set of network resources and the one or more second sets of query suggestions, wherein each one of the one or more second sets of query suggestions is placed proximate to the corresponding one of the one or more network resources from the second set of network resources in the second web page; and providing the second web page in response to the query suggestion being selected.

10. A system for providing one or more sets of query suggestions, comprising:

a memory comprising instructions executable by one or more processors; and the one or more processors coupled to the memory and operable to execute the instructions, the one or more processors being operable when executing the instructions to:

obtain a search query;

identify a set of network resources relating to the search query;

select one or more network resources from the set of network resources;

determine one or more sets of query suggestions, wherein each of the one or more sets corresponds to one of the one or more network resources, wherein each set of the one or more sets is determined based on both the search query and content in a corresponding network resource of the one or more network resources;

construct a web page comprising the one or more network resources and the one or more sets of query suggestions; and provide the web page in response to the search query, wherein each one of the one or more sets of query suggestions is placed in the web page below a summary describing the content of the corresponding network resource and above a Uniform Resource Locator (URL) specifying where the corresponding network resource is located.

11. The system recited in claim 10, wherein the one or more processors are further operable when executing the instructions to:

parse one or more logs maintained by a search engine to extract a plurality of search queries received at the search engine, a plurality of network resources identified for the plurality of search queries by the search engine, and a plurality of resource clicks performed by one or more network users in connection with the plurality of search queries;

for each one of the plurality of search queries, determine a subset of network resources from the plurality of network resources, wherein each network resource from the subset of network resources is accessed by at least one network user in connection with the search query;

determine a resource-click frequency for each network resource from the subset of network resources that represents a total number of times that network resource is accessed in connection with the search query; and compute an average resource-click frequency for the subset of network resources that represents an average number of times each network resource from the subset of network resources is accessed in connection with the search query.

12. The system recited in claim 11, wherein each one of the one or more sets of query suggestions being determined for the corresponding network comprises:

for each one of the plurality of search queries,
determine a resource-click frequency for the corresponding network resource representing a total number of times the corresponding one network resource is accessed in connection with the search query; and
determine a difference between the resource-click frequency of the corresponding network resource in connection with the search query and the average resource-click frequency of the search query; and select from the plurality of search queries one or more search queries corresponding to the difference that is largest to form one set of query suggestions for the corresponding network resource.

13. The system recited in claim 11, wherein each one of the one or more sets of query suggestions being determined for the corresponding network resource further comprises:

if two or more query suggestions from the one set of query suggestions are sufficiently similar to each other, then remove all except one of the two or more query suggestions from the one set of query suggestions.

14. The system recited in claim 10, wherein:
the one or more network resources comprises one or more first network resources from the set of network resources; and
the one or more processors are further operable when executing the instructions to provide one or more second network resources from the set of network resources in response to the search query by including the one or more second network resources in the web page.

15. The system recited in claim 10, wherein the one or more processors are further operable when executing the instructions to:

receive a selection of a query suggestion from one of the one or more sets of query suggestions included in the web page;
identify a second set of network resources relating to the query suggestion;
determine one or more second sets of query suggestions for one or more network resources from the second set of network resources, respectively, wherein each one of the one or more second sets of query suggestions is related to a corresponding one of the one or more network resources from the second set of network resources; and
insert, in the web page, the one or more network resources from the second set of network resources and the one or more second sets of query suggestions in the web page in association with the query suggestion, wherein each one of the one or more second sets of query suggestions is proximate to the corresponding one of the one or more network resources from the second set of network resources.

16. The system recited in claim 15, wherein the one or more network resources from the second set of network resources relating to the query suggestion are different from the one or more network resources from the set of network resources relating to the search query.

17. The system recited in claim 10, wherein the one or more processors are further operable when executing the instructions to:

receive a selection of a query suggestion from one of the one or more sets of query suggestions included in the web page;
identify a second set of network resources relating to the query suggestion;
determine one or more second sets of query suggestions for one or more network resources from the second set of network resources, respectively, wherein each one of the one or more second sets of query suggestions is related to a corresponding one of the one or more network resources from the second set of network resources;
construct a second web page comprising the one or more network resources from the second set of network resources and the one or more second sets of query suggestions, wherein each one of the one or more second sets of query suggestions is placed proximate to the corresponding one of the one or more network resources from the second set of network resources in the second web page; and
provide the second web page in response to the query suggestion.

18. A machine-readable tangible and non-transitory medium having information for providing one or more sets of query suggestions, wherein the information, when read by the machine, causes the machine to perform the following:

obtaining a search query;
identifying a set of network resources relating to the search query;
selecting one or more network resources from the set of network resources;
determining one or more sets of query suggestions, wherein each of the one or more sets corresponds to one of the one or more network resources, wherein each set of the one or more sets is determined based on both the search query and content in a corresponding network resource of the one or more network resources;
constructing a web page comprising the one or more network resources and the one or more sets of query suggestions; and
providing the web page in response to the search query, wherein each one of the one or more sets of query suggestions is placed in the web page below a summary describing the content of the corresponding network resource and above a Uniform Resource Locator (URL) specifying where the corresponding network resource is located.

19. The method of claim 1, further comprising:
determining that a first query suggestion of the one or more sets of query suggestions has been issued to a search engine as an additional search query;
identifying an additional set of network resources relating to the additional search query; and
inserting at least some of the additional set of network resources into the web page, wherein the at least some of the additional set of network resources are placed in the web page proximate to the first query suggestion.

20. The method of claim 19, wherein identifying the additional set of network resources comprises:
determining a ranking of the additional set of network resources based on the additional search query; and
selecting a first number of network resources from the additional set of network resources corresponding to top-ranked network resources based on the ranking, wherein inserting the at least some of the additional set of network resources comprises inserting the first number of network resources.

21. The method of claim 19, further comprising:
determining a ranking of the additional set of network resources based on the additional search query;
determining that the one or more network resources includes at least one additional network resource of the additional set of network resources; and
excluding the at least one additional network resource such that the at least some of the additional set of network resources inserted into the web page lacks the at least one additional network resource.

22. The method of claim 1, wherein determining the one or more sets of query suggestions comprises:
determining a first set of query suggestions of the one or more sets of query suggestions corresponding to a first network resource of the one or more network resources;
determining a second set of query suggestions of the one or more sets of query suggestions corresponding to a second network resource of the one or more network resources;
determining that the first set of query suggestions and the second set of query suggestions both include a same query suggestion; and
removing the same query suggestion from one of the first set of query suggestions and the second set of query suggestions.

* * * * *